United States Patent
Reyes (10) Patent No.: US 10,484,452 B2
(45) Date of Patent: *Nov. 19, 2019

(54) APPROACH FOR SHARING ELECTRONIC DOCUMENTS DURING ELECTRONIC MEETINGS

(71) Applicant: Alex Reyes, Saratoga, CA (US)

(72) Inventor: Alex Reyes, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,466

(22) Filed: Jun. 22, 2015

(65) Prior Publication Data

US 2016/0373516 A1    Dec. 22, 2016

(51) Int. Cl.
*H04L 29/08* (2006.01)
*G06F 3/14* (2006.01)
(Continued)

(52) U.S. Cl.
CPC ........... *H04L 67/06* (2013.01); *G06F 3/0484* (2013.01); *G06F 3/14* (2013.01); *G06F 3/1423* (2013.01);
(Continued)

(58) Field of Classification Search
CPC .................... G06F 3/0484; G06F 21/6209
See application file for complete search history.

(56) References Cited

U.S. PATENT DOCUMENTS 6,289,460 B1    9/2001  Hajmiragha
6,608,636 B1 *  8/2003  Roseman .............. G09B 5/14
                                           348/E7.083
(Continued)

FOREIGN PATENT DOCUMENTS

JP    2003-050793    2/2003
JP    2004-295955    10/2004
(Continued)

OTHER PUBLICATIONS

Microsoft Computer Dictionary, 2002, Microsoft Corporation, Fifth Edition, p. 496.*

(Continued)

*Primary Examiner* — Nicholas Klicos
(74) *Attorney, Agent, or Firm* — Hickman Palermo Becker Bingham LLP; Edward A. Becker (57) ABSTRACT

An approach is provided for sharing electronic documents during electronic meetings. Client devices of meeting participants are configured with a file sharing application that allows participants of an electronic meeting to request and receive, during the electronic meeting, electronic documents that are displayed during the electronic meeting. The file sharing application allows presenters to review and approve or deny requests for electronic documents, and to apply security restrictions to electronic documents on a participant-by-participant basis. Security restrictions may also be specific to particular electronic meetings and access to electronic documents shared during electronic meetings may be restricted to users who were participants of the electronic meetings. The approach is not limited to files per se and is applicable to sharing any type of data in any format or structure.

20 Claims, 6 Drawing Sheets

(51) Int. Cl.
  *G06F 3/0484* (2013.01)
  *G06F 21/62* (2013.01)
  *G06F 21/60* (2013.01)
  *H04M 7/00* (2006.01)
(52) U.S. Cl.
  CPC ........ *G06F 21/604* (2013.01); *G06F 21/6209* (2013.01); *H04L 67/22* (2013.01); *H04M 7/0027* (2013.01); *G06F 2221/2113* (2013.01); *G09G 2358/00* (2013.01); *G09G 2370/16* (2013.01)

(56) References Cited

U.S. PATENT DOCUMENTS

| | | | |
|---|---|---|---|
| 7,353,252 B1* | 4/2008 | Yang | G06Q 10/10 709/204 |
| 7,478,129 B1 | 1/2009 | Chemtob | |
| 8,516,050 B1 | 8/2013 | Chapweske | |
| 8,789,094 B1 | 7/2014 | Singh et al. | |
| 8,892,679 B1 | 11/2014 | Destagnol et al. | |
| 8,914,734 B2* | 12/2014 | Narayanaswamy | H04M 3/56 715/751 |
| 8,972,869 B1 | 3/2015 | Willis | |
| 2002/0085029 A1* | 7/2002 | Ghani | G06O 10/10 715/751 |
| 2005/0063365 A1* | 3/2005 | Mathew | G06Q 10/10 370/352 |
| 2005/0227216 A1 | 10/2005 | Gupta | |
| 2006/0092863 A1* | 5/2006 | Schmidt | H04L 12/1822 370/260 |
| 2007/0208826 A1* | 9/2007 | Devolites | G06F 16/1824 709/219 |
| 2008/0107271 A1* | 5/2008 | Mergen | H04L 9/30 380/278 |
| 2008/0222734 A1* | 9/2008 | Redlich | G06F 21/577 726/26 |
| 2008/0229211 A1 | 9/2008 | Herberger | |
| 2008/0294899 A1* | 11/2008 | Gazzetta | G06F 21/6218 713/170 |
| 2009/0006982 A1* | 1/2009 | Curtis | G06Q 10/10 715/753 |
| 2009/0178144 A1* | 7/2009 | Redlich | G06F 21/6209 726/27 |
| 2009/0288147 A1* | 11/2009 | Yeung | G06F 21/84 726/4 |
| 2010/0158254 A1* | 6/2010 | Schaad | G06F 21/6209 380/282 |
| 2010/0332401 A1* | 12/2010 | Prahlad | G06F 17/302 705/80 |
| 2011/0264745 A1* | 10/2011 | Ferlitsch | H04L 12/1827 709/205 |
| 2012/0221952 A1 | 8/2012 | Chavez | |
| 2012/0221963 A1* | 8/2012 | Motoyama | G06F 21/6218 715/753 |
| 2013/0030878 A1 | 1/2013 | Weaver | |
| 2013/0060594 A1* | 3/2013 | Motoyama | G06Q 10/1097 705/7.21 |
| 2013/0104194 A1 | 4/2013 | Rago et al. | |
| 2013/0145284 A1* | 6/2013 | Anantharaman | H04L 12/1822 715/753 |
| 2013/0339525 A1* | 12/2013 | Tamari | G06F 3/011 709/225 |
| 2014/0101268 A1* | 4/2014 | Borghetti | G06Q 10/1093 709/206 |
| 2014/0114878 A1* | 4/2014 | Bluth | G06Q 40/06 705/36 R |
| 2014/0149505 A1* | 5/2014 | Christiansen | H04L 65/4015 709/204 |
| 2014/0164761 A1* | 6/2014 | Kufluk | H04L 63/10 713/155 |
| 2014/0215004 A1* | 7/2014 | Daly, Jr. | G06F 17/30011 709/214 |
| 2014/0245185 A1 | 8/2014 | Knodt et al. | |
| 2014/0282013 A1 | 9/2014 | Amijee | |
| 2015/0049163 A1* | 2/2015 | Smurro | H04L 65/4015 348/14.08 |
| 2015/0066556 A1 | 3/2015 | Dominick et al. | |
| 2015/0169069 A1* | 6/2015 | Lo | G06F 3/017 715/753 |
| 2015/0378995 A1* | 12/2015 | Brown | H04L 12/1827 707/608 |
| 2016/0070812 A1 | 3/2016 | Murphy | |
| 2016/0344567 A1* | 11/2016 | Navale | H04L 12/1822 |
| 2016/0373387 A1 | 12/2016 | Reyes et al. | |
| 2017/0118271 A1 | 4/2017 | Reyes | |

FOREIGN PATENT DOCUMENTS

| | | |
|---|---|---|
| JP | 2006-140790 | 6/2006 |
| JP | 2006-251977 | 9/2006 |
| JP | 2007-213467 | 8/2007 |
| JP | 2010-182074 | 8/2010 |
| JP | 2013140549 | 1/2015 |
| WO | WO 2014/197819 A2 | 12/2014 |

OTHER PUBLICATIONS

Reyes, U.S. Appl. No. 14/746,175, filed Jun. 22, 2015, Office Action, dated Jan. 27, 2017.
European Patent Office, "Search Report" in application No. 16174777.9-1955, dated Jul. 11, 2016, 7 pages.
Reyes, U.S. Appl. No. 14/746,175, filed Jun. 22, 2015, Final Office Action, dated Jun. 13, 2017.
Reyes, U.S. Appl. No. 14/920,677, filed Oct. 22, 2015, Office Action, dated Jan. 18, 2018.
U.S. Appl. No. 14/746,175, filed Jun. 22, 2015, Adviosry Action, dated Aug. 22, 2017.
Reyes, U.S. Appl. No. 14/746,175, filed Jun. 22, 2015, Advisory Action, dated Dec. 27, 2018.
Reyes, U.S. Appl. No. 14/920,677, filed Oct. 22, 2015, Final Office Action, dated Aug. 7, 2018.
Reyes, U.S. Appl. No. 14/746,175, filed Jun. 22, 2015, Notice of Allowance, dated Mar. 18, 2019.

* cited by examiner

Participant A                                              Requested Documents Screen 250

| Meeting Name/ID | Document Name | Presenter Name | Request Status | Security Restrictions |
|---|---|---|---|---|
| Meeting #1 | Document A | Participant B. | Pending | n/a |
| Meeting #1 | Document B | Bob H. | Granted | Level 1 (No Restrictions) |
| Meeting #1 | Document C | Judy P. | Granted | Level 2 (Security Code) |
| Meeting #2 | Document D | Sarah U. | Granted | Level 3 (Enhanced Security) |
| Meeting #2 | Document E | Adam T. | Denied | n/a |

FIG. 2C

Participant B                                              Shared Documents Screen 270

| Meeting Name/ID | Document Name | Requestor Name | Request Status | Security Restrictions |
|---|---|---|---|---|
| Meeting #1 | Document A | Participant A. | Pending | Deny, Level 1; Level 2; Level 3 |
| Meeting #1 | Document A | Participant C | Pending | Deny, Level 1; Level 2; Level 3 |
| Meeting #1 | Document A | Participant D | Granted | Level 3 (Enhanced Security) |
| Meeting #2 | Document F | Participant D. | Granted | Level 2 (Security Code) |
| Meeting #5 | Document G | Participant F | Granted | Level 1 (No Restrictions) |
| Meeting #3 | Document H | Participant X | Denied | n/a |
| Meeting #2 | Document I | Participant Y | Denied | n/a |

452 A Particular Electronic Document is Shared During an Electronic Meeting

454 Participant Requests Access to the Particular Electronic Document

456 File Sharing Application Performs Participant Authentication

458 File Sharing Application Queries the User for Security Information

460 File Sharing Application Verifies the Security Information and Grants the User Access to the Particular Electronic Document

FIG. 4A

Electronic Meeting Document Tracking Data 400

| Meeting Name/ID | Document Name | Meeting Participants |
|---|---|---|
| Meeting #1 | Document A | Participant A, Participant B, Participant C |
| Meeting #1 | Document B | Participant A, Participant B, Participant C |
| Meeting #1 | Document C | Participant A, Participant B |
| Meeting #2 | Document D | Participant A, Participant D |
| Meeting #2 | Document E | Participant A, Participant E |

FIG. 5

APPROACH FOR SHARING ELECTRONIC DOCUMENTS DURING ELECTRONIC MEETINGS

RELATED APPLICATION DATA AND CLAIM OF PRIORITY

This application is related to U.S. patent application Ser. No. 14/746,175 entitled APPROACH FOR SHARING ELECTRONIC DOCUMENTS DURING ELECTRONIC MEETINGS, filed Jun. 22, 2015, the contents all of which are incorporated by reference in their entirety for all purposes as if fully set forth herein.

FIELD OF THE INVENTION

Embodiments relate generally to electronic meetings and file sharing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A variety of collaboration tools now exists for conducting electronic meetings over networks. These tools allow meeting participants, in geographically disparate locations, to simultaneously view electronic documents, share computer desktops and conduct video conferencing. One of the issues with these tools, however, is that meeting participants interested in a copy of an electronic document viewed during an electronic meeting must separately request the electronic document from the meeting organizer or the participant who presented the electronic document. The electronic document has to then be separately provided to the requestor, typically via email. Another issue is that electronic documents are often provided to requestors without any security restrictions, which allows unauthorized access to or use of the electronic documents by third parties.

SUMMARY

An apparatus includes one or more processors, one or more memories communicatively coupled to the one or more processors, a display, a collaboration client executing on the apparatus and configured to support an electronic meeting via one or more networks with another apparatus that is external to the apparatus and a file sharing application. The file sharing application is configured to receive, from a user, a request for the user to access a particular electronic document that was displayed during the electronic meeting and determine, based upon electronic meeting tracking data, whether the user was a participant of the electronic meeting when the particular electronic document was displayed during the electronic meeting. The file sharing apparatus is also further configured to in response to determining, based upon electronic meeting tracking data, that the user was a participant of the electronic meeting when the particular electronic document was displayed during the electronic meeting, then decrypt an encrypted version of the electronic document to recover the electronic document using one or more of data generated by a file sharing application of a presenter of the electronic document during the electronic meeting, or data specified by a presenter of the electronic document during the electronic meeting and cause the electronic document to be presented to the user.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
   A. Client Devices
   B. Collaboration Server
III. SHARING ELECTRONIC DOCUMENTS DURING ELECTRONIC MEETINGS
   A. Requesting Electronic Documents
   B. Processing Requests for Electronic Documents
   C. Participant Authentication
IV. IMPLEMENTATION MECHANISMS I. Overview An approach is provided for sharing electronic documents during electronic meetings. Client devices of meeting participants are configured with a file sharing application that allows participants of an electronic meeting to request and receive, during the electronic meeting, electronic documents that are displayed during the electronic meeting. The file sharing application allows presenters to review and approve or deny requests for electronic documents, and to apply security restrictions to electronic documents on a participant-by-participant basis. Security restrictions may also be specific to particular electronic meetings and access to electronic documents shared during electronic meetings may be restricted to users who were participants of the electronic meetings. The approach provides a user-friendly approach for both presenters and participants to share electronic documents on-demand during electronic meetings. Although embodiments are described herein in the context of sharing files, embodiments are not limited to files per se and are applicable to sharing any type of data in any format or structure.

II. System Architecture

Figure 1:
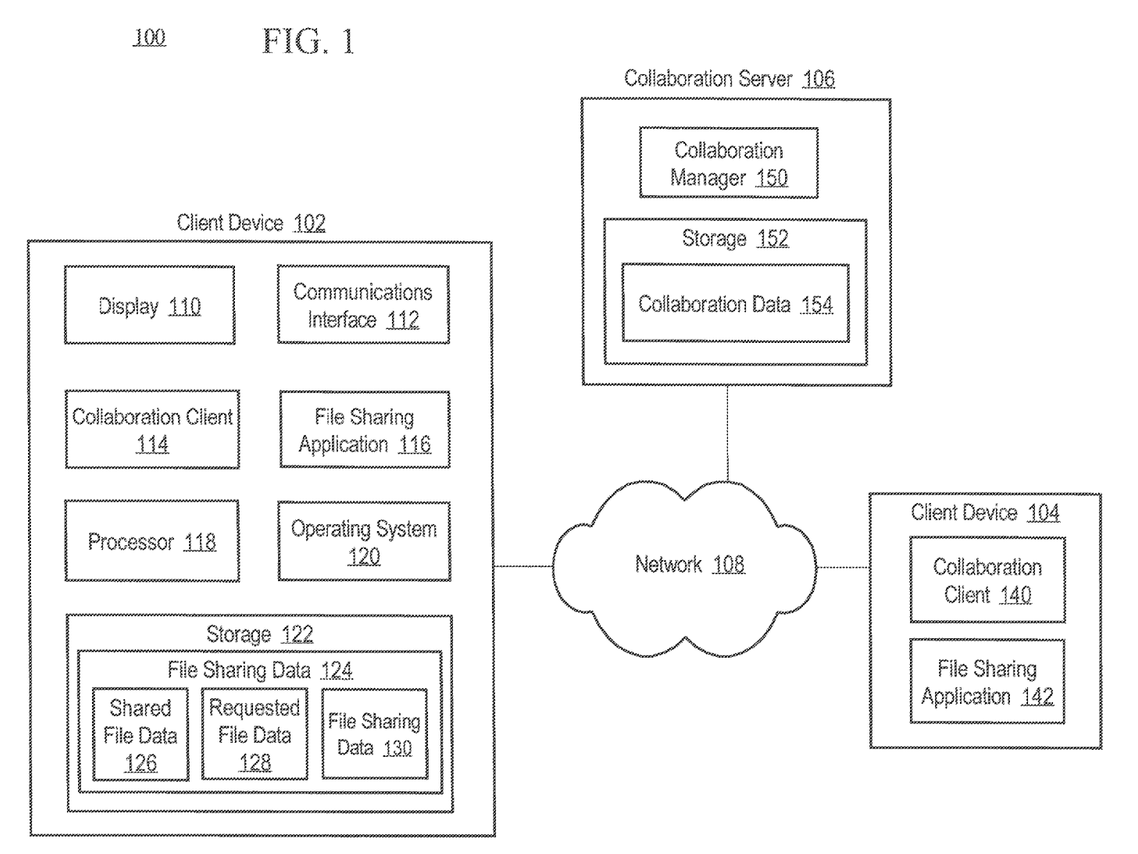
FIG. 1 is a block diagram that depicts an arrangement for sharing electronic documents during electronic meetings.

FIG. 1 is a block diagram that depicts an arrangement 100 for sharing electronic documents during electronic meetings. Arrangement 100 includes client devices 102, 104 and a collaboration server 106, communicatively coupled via a network 108. Arrangement 100 is not limited the particular elements depicted in FIG. 1 and may include fewer or additional elements depending upon a particular implementation. Network 108 is depicted in FIG. 1 as a single network for purposes of explanation only and network 108 may include any number and types of wired or wireless networks, such as local area networks (LANs), wide area networks (WANs), the Internet, etc. The various elements depicted in FIG. 1 may also communicate with each other via direct communications links that are not depicted in FIG. 1 for purposes of explanation.

A. Client Devices

Client devices 102, 104 may be any type of client device that is capable of participating in an electronic meeting. Example implementations of client devices 102, 104 include, without limitation, a workstation, personal computer, laptop computer, tablet computing device, personal digital assistant, smart phone, an interactive whiteboard appliance, etc. In the example depicted in FIG. 1, client device 102 is depicted with various components that may also be included in client device 104, but these components are depicted in the figures and described only with respect to client device 102 for purposes of explanation.

In the example depicted in FIG. 1, client device 102 includes a display 110, a communications interface 112, a collaboration client 114, a file sharing application 116, a processor 118, an operating system (OS) 120, and storage 122. These elements are described in more detail hereinafter. Client device 102 may include fewer or more components that those depicted in FIG. 1 and described herein and the particular components used may vary depending upon a particular implementation and client device 102 is not limited to a particular set of components or features. For example, client device 102 may also include manual controls, such as buttons, slides, etc., not depicted in FIG. 1, for performing various functions on mobile device, such as powering on/off or changing the state of client device 102 and/or display 110.

Display 110 may be implemented by any type of display that displays images and information to a user and may also be able to receive user input and embodiments are not limited to any particular implementation of display 110. As one non-limiting example, display 110 may be a touchscreen display 110 that both displays information to users and allows user to select graphical user interface objects. Client device 102 may have any number of displays 120, of similar or varying types, located anywhere on client device 102.

Communications interface 112 may include computer hardware, software, or any combination of computer hardware and software to provide wired and/or wireless communications between client device 102 and other devices and/or networks, such as collaboration server 106 and client device 104. The particular components for communications interface 112 may vary depending upon a particular implementation and embodiments are not limited to any particular implementation of communications interface 112.

Collaboration client 114 is an application that executes on client device 102 and, in conjunction with collaboration server 106, supports electronic meetings between client device 102 and other devices, such as client device 104. One non-limiting example implementation of collaboration client 114 is a Microsoft Lync Client. Client device 104 also includes a collaboration client 140 that may include the same functionality as collaboration client 114.

File sharing application 116 is an application that executes on client device 102 and allows electronic meeting participants to request and receive, during the electronic meeting, electronic documents that are displayed during the electronic meeting. File sharing application 116 allows presenters to review and approve or deny requests, and to apply security restrictions to electronic documents on a participant-by-participant basis. File sharing application 116 may maintain information about past, present and future electronic meetings, including the meeting participants and their status, as well as requests for electronic documents, the status of requests, and electronic documents that have been shared. File sharing application 116 may be implemented in computer hardware, computer software, or any combination of computer hardware and computer software. File sharing application 116 may be implemented as a stand-alone entity, as depicted in FIG. 1 for purposes of explanation only, or implemented as part of one or more other entities. For example, file sharing application 116 may be implemented as part of collaboration client 114 or as a plug-in to collaboration client 114. File sharing application 116 may display, in conjunction with collaboration client 114 and other components on client device 102, such as a UI component (not displayed in FIG. 1), and OS 120, various graphical user interface controls for sharing electronic documents displayed during an electronic meeting. Client device 104 also includes a file sharing application 142 that may include the same functionality as file sharing application 116.

Operating system 120 executes on client device 102 and may be any type of operating system that may vary depending upon a particular implementation and embodiments are not limited to any particular implementation of operating system 120. Operating system 120 may include multiple operating systems of varying types, depending upon a particular implementation. Processor 118 may be any number and types of processors and storage 122 may be implemented by any number and types of memories, including volatile memory and non-volatile memory, which may vary depending upon a particular implementation.

In the example depicted in FIG. 1, storage 122 stores file sharing data 124 that includes shared file data 126, requested file data 128 and file sharing data 130. Shared file data 126 indicates data, such as one or more electronic documents, that have been requested by other participants of an electronic meeting. Shared file data 126 may specify, for example, requests for data, the status of those requests, e.g., granted or denied, timestamp data that indicates when and by whom data was requested and security restrictions applied to data for which a request has been granted, which may be on a participant-by-participant basis. Shared file data 126 may also include the actual data that has been shared with other participants. Shared file data 126 may be specific to a particular user, for example a particular user of client device 102, or may be specific to multiple users.

Requested file data 128 is data that indicates data, such as one or more electronic documents, that have been requested by a participant of an electronic meeting, such as a user of client device 102. Requested file data 128 may specify, for example, requests for data, the status of those requests, e.g., granted or denied, timestamp data that indicates when and by whom data was requested, the owner and/or location of the data, and security restrictions applied to data for which a request has been granted, which may be on a participant-by-participant basis. Requested file data 128 may also include the actual data that has been requested and granted by other participants. Requested file data 128 may be specific to a particular user, for example a particular user of client device 102, or may be specific to multiple users.

File sharing data 130 may be used by file sharing application 116 and specify, for example, the participants of an electronic meeting and the status of the participants, for example, whether the participants are presenters or participants.

Although depicted in FIG. 1 as separate data for purposes of explanation, shared file data 126, requested file data 128 and file sharing data 130 may be combined in any manner and stored in any format or according to any type of data structure that may vary depending upon a particular implementation.

B. Collaboration Server

Collaboration server 106 manages electronic meetings conducted between devices, such as client devices 102, 104. In the example depicted in FIG. 1, collaboration server includes a collaboration manager 150 and storage 152 that stores collaboration data 154. Collaboration manager 150 may interact with collaboration clients on client devices 102, 104 to manage electronic meetings. The electronic meetings may include document sharing, desktop sharing, videoconferencing, etc. Collaboration data 154 may include data for supporting and managing electronic meetings, for example, data that indicates information about the electronic meeting itself, participants, content shared during the electronic meeting, etc. One non-limiting example implementation of collaboration manager 150 is a Microsoft Lync Server. Storage 152 may be implemented by any number and types of memories, including volatile memory and non-volatile memory, which may vary depending upon a particular implementation. Collaboration server 106 may include various other components that may vary depending upon a particular implementation and collaboration server 106 is not limited to a particular set of components or features. The use of a collaboration server 106 is optional and embodiments are applicable to electronic meeting systems that do not use a collaboration server, for example, peer-to-peer collaboration systems.

III. Sharing Electronic Documents During Electronic Meetings

Figure 2A:
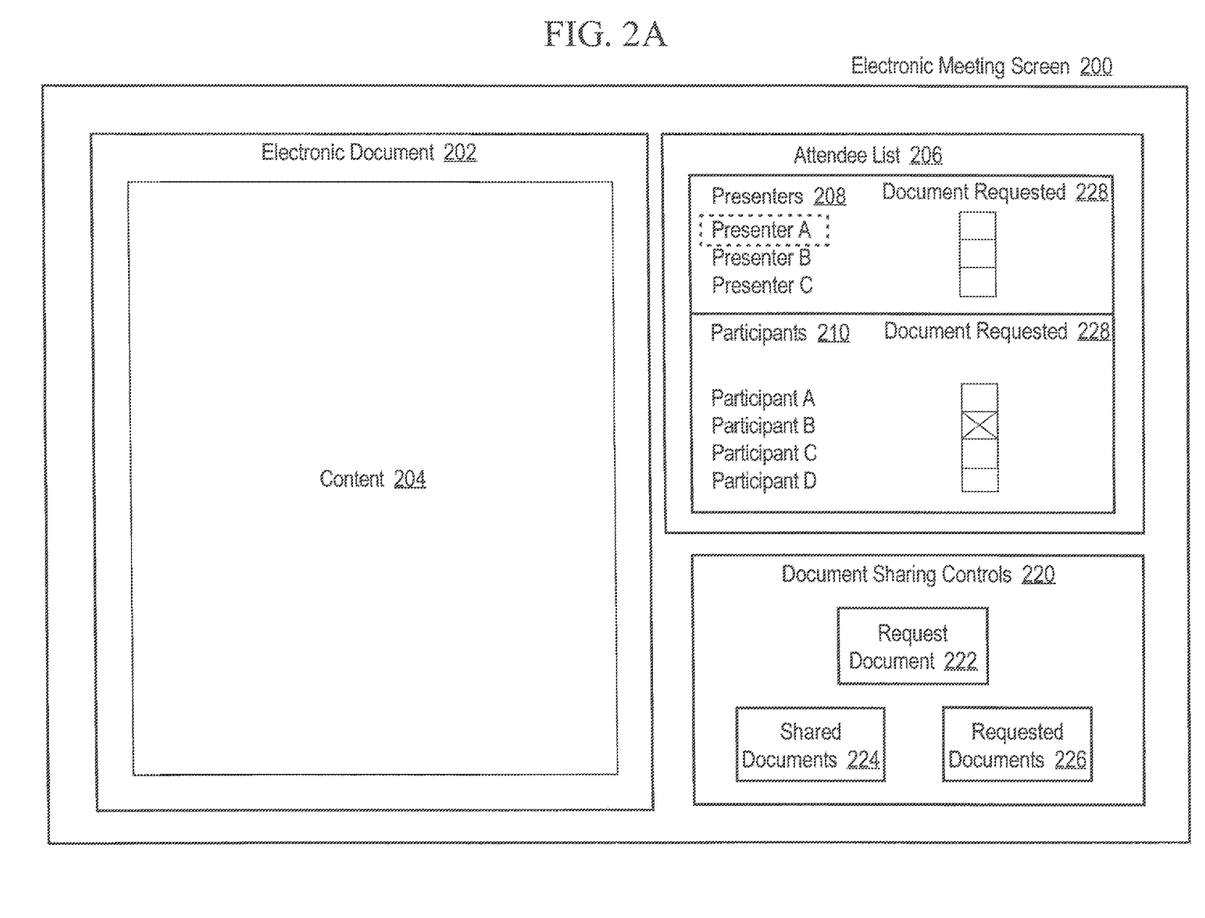
FIG. 2A depicts an example electronic meeting screen.

FIG. 2A depicts an example electronic meeting screen 200 generated, for example, by collaboration client 114 and file sharing application 116. Thus, each participant in an electronic meeting may have their own electronic meeting screen 200. Electronic meeting screen 200 includes an electronic document 202 having content 204 that is currently being displayed during an electronic meeting. Examples of electronic document 202 include, without limitation, slide show presentations, word processing documents, images, videos, etc. Electronic meeting screen 200 may include graphical user interface controls for manipulating electronic document 202 and/or content 206 that are not depicted in FIG. 2A and described herein for purposes of explanation. As one example, such controls may allow minimizing and maximizing the display of electronic document 202 and content 206, and for taking control of an electronic meeting or giving control of an electronic meeting to another participant. Embodiments are applicable to dynamic meetings in which any participant may be a presenter or attendee at any time. Accordingly, electronic meeting screen 200 may include controls that allow a user to designate themselves as a presenter or attendee, and/or to switch between being a presenter and an attendee. The controls presented to a presenter/attendee may be specific to the presenter/attendee's current role. For example, a participant who is currently a presenter may have a different set of electronic meeting controls than a participant who is currently an attendee, and those controls may vary depending upon a particular implementation.

Electronic meeting screen 200 includes an attendee list 206 that identifies participants in the electronic meeting. The participants are separately identified as presenters 208 and participants 210. Presenters 208 are participants who have previously or are currently presenting information to the other participants and participants 210 are non-presenter participants who are participating in the electronic meeting, and may be requesting information from other participants, but are not presenting information to other participants. In the example depicted in FIG. 2A, presenters 208 include three presenters identified as Presenter A, Presenter B, and Presenter C, and the dashed rectangle visually indicates that Presenter A is currently presenting electronic document 202. Participants 210 include four participants identified as Participant A, Participant B, Participant C and Participant D. Additional controls may be provided, for example, to collapse and expand the presenters 208 and participants 210 lists, which may be useful when the number of presenters 208 and/or participants 210 is large.

Electronic meeting screen 200 includes document sharing controls 220 generated by file sharing application 116. Document sharing controls 220 may be represented by any type and number of graphical user interface objects that may vary depending upon a particular implementation and embodiments are not limited to the examples depicted in FIG. 2A and described herein. According to one embodiment, document controls 220 include controls request document 222, shared documents 224 and requested documents 226. The request document 222 control is used by a participant to request the electronic document 202 that is currently being displayed during the electronic meeting. The shared documents 224 control is used by a particular participant to view a list of electronic documents displayed during the electronic meeting to which the particular participant has granted access to other participants. The requested documents 226 control is used by a particular participant to view a list of electronic documents displayed during the electronic meeting that the particular participant has requested. Document requested 228 controls visually depict which of the current presenters and participants have requested the electronic document 202 currently being displayed. Document requested controls 228 are depicted in FIG. 2A as selectable boxes for purposes of explanation, but embodiments are not limited to the example depicted in FIG. 2A. For example, graphical symbols may be displayed to indicate that an electronic document has been requested by a participant. Attributes of the graphical symbols may be changed to visually indicate a change in status. For example, different colors, sizes and other attributes such as blinking, etc., may be used to indicate current status, order and priority of requests for electronic documents. Controls, such as request document 222, shared documents 224 and requested documents 226 may be displayed in a different manner depending upon the role of a participant. For example, if a particular participant is currently an attendee and has never been a presenter in the current electronic meeting, then the shared documents 224 control may not be made available until the particular participant's role is changed from an attendee to a presenter.

A. Requesting Electronic Documents

A user of client device 102 requests a currently-displayed electronic document, such as electronic document 202, by selecting the request document 222 control. In response to selecting the request document 222 control, file sharing application 116 generates and transmits a request for electronic document 202 to the presenter of electronic document 202. This may include file sharing application 116 transmitting the request for electronic document 202 to the file sharing application executing on the computing device of the presenter of electronic document 202. File sharing application 116 may consult file sharing data 130 to determine the presenter of electronic document 202. Alternatively, file sharing application 116 may generate and transmit a request to collaboration server 106 and/or one or more of the participants of the electronic meeting to determine the presenter of electronic document 202. As described in more detail hereinafter, the presenter of the electronic document 202 is notified of the request for the electronic document and is able to reject or accept the request, and also apply one or more security restrictions to the electronic document 202. The file sharing application on the computing device of the requestor then generates and transmits a response to the request to file sharing application 116 of the requestor.

File sharing application 116 receives the response to the request and updates requested file data 128 based upon the response. For example, file sharing application 116 may update requested file data 128 to indicate that a request was made for electronic document 202, whether the request was granted or denied, timestamp data that indicates when and by whom data was requested, the owner and/or location of the data, and security restrictions applied to data for which a request has been granted. The response to the request may also include the electronic document 202 or alternatively, file sharing application 116 may separately request electronic document 202 once the request is granted. File sharing application 116 may then store the received electronic document 202, for example, on storage 122. This may be accomplished by file sharing application 116 accessing one or more functions provided by OS 120 and may include display of a dialog box to give the user an option to specify the location where the electronic document 202 is to be stored. Alternatively, the electronic document 202 may be stored in a default or previously specified location on storage 202. This process may be performed easily and quickly by the user simply selecting the request document 222 control. This eliminates the need for the user to separately contact and acquire the electronic documents 202 from the presenter, for example via email, which is particularly convenient when the user does not have current contact information for the presenter.

Figure 2B:
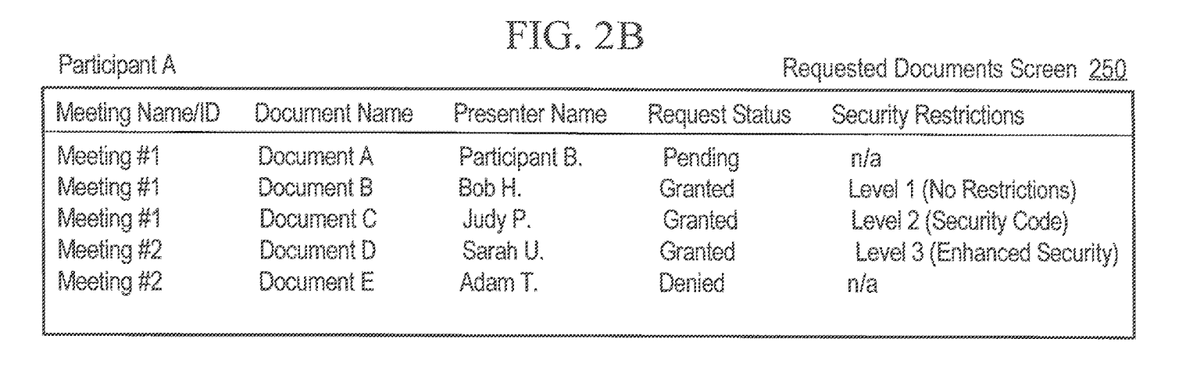
FIG. 2B depicts an example requested documents screen.

A user may also view information about documents that the user has selected by selecting the requested documents 226 control. FIG. 2B depicts an example requested documents screen 250 for Participant A that provides information about requests made by Participant A for electronic documents displayed during electronic meetings. Requested documents screen 250 may be generated by file sharing application 116 in response to the user selection of the requested documents 226 control. The electronic documents may have been requested during a single or multiple electronic meetings. Requested documents screen 250 depicts information for five documents, identified as Document A-Document E, requested by the user. The information includes a meeting name/ID, a document name, a presenter name, a request status and security restrictions. The information depicted in FIG. 2B is example information and additional or less information may be used, depending upon a particular implementation. The request status indicates whether the request is pending, has been granted, or has been denied. The security restrictions may be not applicable (n/a) for pending and denied requests. In the example depicted in FIG. 2B, three levels of restrictions are available, identified as Level 1 (No restrictions), Level 2 (Security Code) and Level 3 (Enhanced Security). The Level 2 (Security Code) and Level 3 (Enhanced Security) security restrictions indicate that one or more security restrictions have been applied to the requested electronic document to control access to and/or processing of the electronic document. The Level 2 (Security Code) security restriction requires that the security code be provided by the participant to open and/or process the electronic document. The security code may be specified by a presenter after the presenter specifies that Level 2 (Security Code) security The security code may be included with the electronic document or provided separate from the electronic document. For example, a separate message with the security code may be automatically generated and transmitted to the requestor. Alternatively, the electronic document may be encrypted with the security code.

The Level 3 (Enhanced Security) security restriction provides relatively stronger access control than the Level 2 (Security Code) security restriction. For example, the electronic document may be encrypted with an encryption key and stronger encryption may be used compared to the Level 2 (Security Code) security restriction. As another example, Level 3 (Enhanced Security) security restrictions may require user authentication to access an electronic document. User authentication may be enforced at a client device or other types of end user devices, such as printers, MFPs, etc. User authentication may be performed using a wide variety of approaches, such as via an authentication card reader, alpha-numeric code, etc., and then validated locally at a device or remotely, for example, using a lightweight directory access protocol (LDAP) server. Once authentication is successfully completed, a user may be allowed to access and/or process an electronic document.

Thus, the security restrictions may represent a hierarchy of security restrictions that may be applied to requested electronic documents. The security restrictions depicted in FIG. 2B are examples only and the particular security restrictions used may vary, depending upon a particular implementation. While the security restrictions are depicted in FIG. 2B by textual descriptions, embodiments are not limited to this example and graphical representations and/or symbols may be used to depict security restrictions specified for requested electronic documents. For example, symbols having different visual attributes, such as shape, size, color, etc., may be used in place of, or in addition to, the textual descriptions. This approach allows a participant to quickly and easily determine the status of their requests for electronic documents displayed during an electronic meeting.

Figure 3A:
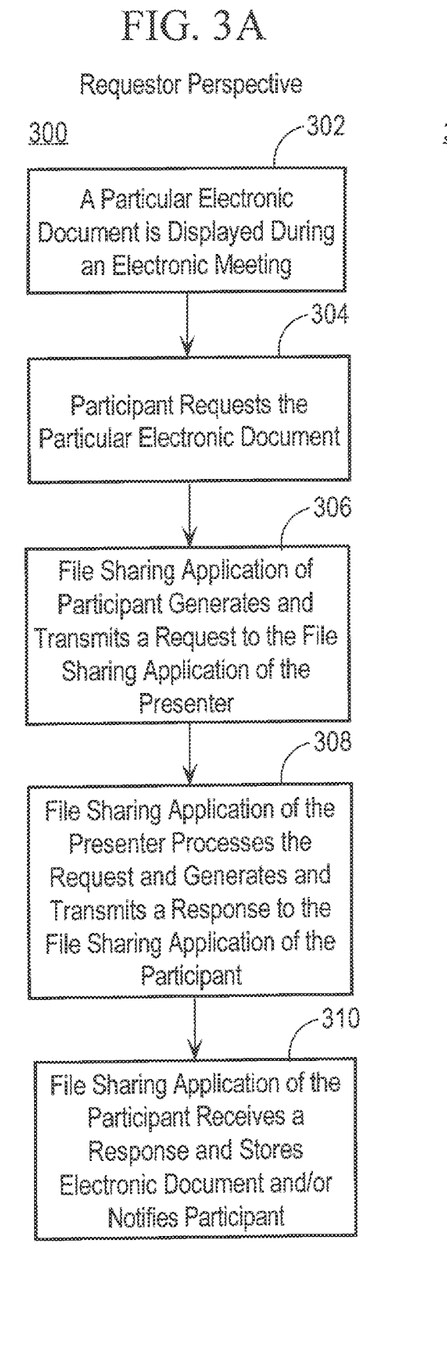
FIG. 3A is a flow diagram that depicts an approach for a sharing electronic documents during an electronic meeting from the perspective of a participant.

FIG. 3A is a flow diagram 300 that depicts an approach for a sharing electronic documents during an electronic meeting from the perspective of a participant. In step 302, a particular electronic document is displayed during an electronic meeting. For example, a user of client device 102 chooses to participant in an electronic meeting with a user of client device 104 who is presenting the particular electronic document. In this example, the user of client device 102 is considered to be a participant and the user of client device 104 is considered to be the presenter. The electronic meeting may be established using the collaboration clients 114, 140 and optionally collaboration manager 150. The particular electronic document may be displayed using the electronic meeting screen 200, including the document sharing controls 220, as previously described herein.

In step 304, the participant wishes to obtain the particular document and requests the particular electronic document. For example, the participant may request the particular electronic document by selecting the request document 222 control.

In step 306, the file sharing application 116 on client device 102 generates and transmits a request for the particular electronic document to file sharing application 142. The request includes data that identifies the particular electronic document and the requestor, i.e., the user of client device 102. File sharing application 116 may obtain data that identifies the particular electronic document currently being displayed from collaboration client 114, collaboration manager 150 or from collaboration client 140, depending upon a particular implementation. For example, collaboration client 114 may include an API with a function that can be invoked by file sharing application 116 to obtain data that identifies the particular electronic document currently being displayed. The request may include additional data, be in any format supported by file sharing applications 116, 142 and may be encrypted, depending upon a particular application. File sharing application 116 also updates file sharing data 130 to include the request so that electronic meeting screen 200 will indicate that the participant has requested the particular electronic document. In the present example, file sharing application 142 will be notified by the request that the participant has requested the particular electronic document. In situations where additional participants are participating in the electronic meeting, file sharing application 116 may also notify the respective file sharing applications of the other participants that the participant has requested the particular electronic document so that their respective electronic meeting screens 200 will indicate that the participant has requested the particular electronic document.

In step 308, the file sharing application of the presenter, i.e., file sharing application 142, receives and processes the request, and generates and transmits a response to file sharing application. The response may specify whether the request was denied or granted and if granted, may include either the particular electronic document or information, such as a link or reference, which provides access to the particular electronic document. For example, the response may include a link to the particular electronic document stored on client device 104 or on a cloud server. In situations where additional participants are participating in the electronic meeting, file sharing application 142 may also notify the respective file sharing applications of the other participants to indicate whether that the participant has requested the particular electronic document so that their respective electronic meeting screens 200 will indicate that the participant has requested the particular electronic document.

In step 310, file sharing application 116 receives and processes the response from file sharing application 142. If the response indicates that the request was granted, file sharing application 116 retrieves and stores the particular electronic document, for example, on storage 122. File sharing application 116 also updates file sharing data 130 to indicate the current status of the request so that the requested documents screen 250 will indicate the current status of the participant's request for the particular electronic document. Any security restrictions applied to the particular electronic document by the presenter are subsequently enforced when the particular electronic document is accessed or processed. For example, security restrictions may be applied when an attempt is made to open the particular electronic document, and/or process the particular electronic document using applications, email, or at a printer multi-function peripheral (MFP), etc. Application of the security restrictions may require, for example, that a user enter a security code or be authenticated prior to accessing or processing the particular electronic document. For example, if Level 2 (Security Code) security restrictions were applied to the particular electronic document, the user may be required to enter the security code specified by the presenter to open the particular electronic document in an application program, such as a word processing program or a pdf viewer, or to print the particular electronic document at a printer or MFP.

B. Processing Requests for Electronic Documents

Figure 2C:
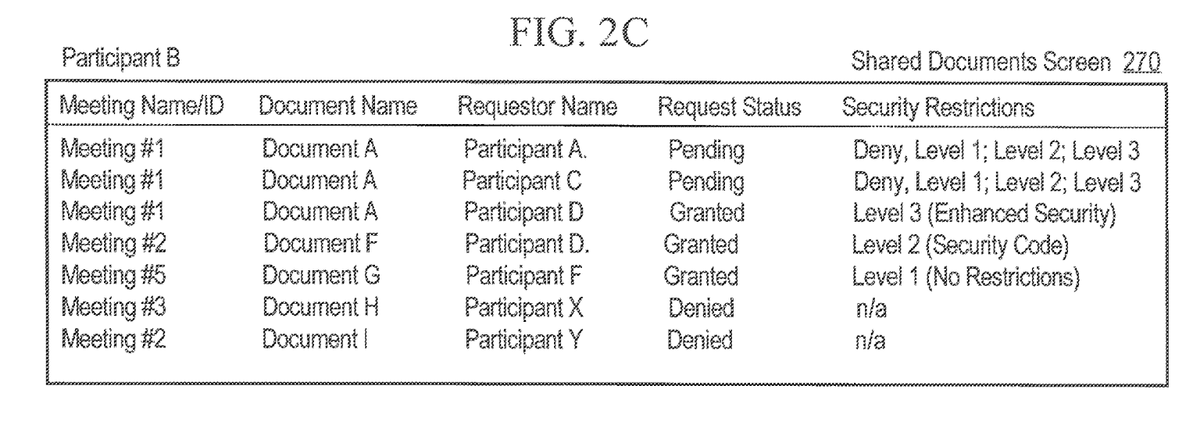
FIG. 2C depicts an example shared documents screen.

A user of client device 102 processes requests for electronic documents, such as electronic document 202, by selecting the shared documents 224 control. In response to selecting the request document 222 control, file sharing application 116 provides one or more graphical user interface controls that allow a user to display and manage requests for one or more electronic documents presented by the user during one or more electronic meetings. FIG. 2C depicts an example shared documents screen 270 for Participant B that provides information about requests for electronic documents presented by Participant B during electronic meetings. Shared documents screen 270 is displayed by the file sharing application executing on the computing device of Participant B.

Shared documents screen 270 may be generated by file sharing application 116 in response to the user selection of the shared documents 224 control. The electronic documents may have been requested during a single or multiple electronic meetings. Shared documents screen 270 depicts information for seven requests for electronic documents, including three requests for Document A and a single request for each of Document F, Document G, Document H and Document I. The information for the requests includes a meeting name/ID, a document name, a requestor name, a request status and security restrictions. The information depicted in FIG. 2C is example information and additional or less information may be used, depending upon a particular implementation. The request status indicates whether the request is pending, has been granted, or has been denied. The security restrictions are not applicable (n/a) for pending and denied requests.

In the example depicted in FIG. 2C, the security restrictions include controls for denying a request or applying a security restriction level to a request, which implicitly includes accepting a request. Any of the content in shared documents screen 270 may be active and selectable by a user. For example, a user may use a selection mechanism, such as a computer mouse, to select one of the columns, such as Meeting Name/ID to cause the information in shared documents screen 270 to be sorted by the selected column. In addition, data within shared documents screen 270 may be selected by a user. For example, Participant B may use a selection device, such as a computer mouse, to select "Deny" and the request from Participant A for Document A is denied. As another example, Participant B may select "Level 1" and the request from Participant A for Document A is accepted with Level 1 security restrictions applied for Document A with respect to Participant A. Each request is specific to a particular requestor and granting a request with a particular security restriction is specific to the particular requestor and different security restrictions (or no security restrictions) may be applied to different requests, even for the same electronic document. According to one embodiment, graphical user interface objects, such as symbols and icons may be used in place of, or in addition to, the text depicted in shared documents screen 270 for denying or granting requests and for applying security restrictions. For example, symbols may be displayed that correspond to the actions of denying a request, accepting and applying Level 1, Level 2 or Level 3 security restrictions to provide a more user friendly experience for the presenter of the electronic document. A security restriction (or no security) may be specified as a default. For example, all electronic documents may have a default restriction requirement of "deny" in high security environments, making them non-sharable unless the presenter overrides the default security restriction.

Multiple requests may be made for the same electronic document. For example, it is not uncommon for several participants of an electronic meeting to request the same electronic document that is being displayed. As depicted in FIG. 2C, three requests have been made for Document A by Participant A, Participant C and Participant D. The request from Participant D has been granted with Level 3 (Enhanced Security) and the requests from Participant A and Participant C are currently pending. Alternatively, shared documents screen 270 may include a single entry (row) for each electronic document and provide a visual indication that multiple requests are associated with a particular electronic document. For example, a user-selectable graphic, symbol or icon may be displayed to indicate that multiple requests exist for a particular electronic document. As another example, one or more visual attributes, such as color, bolding, underlining, etc., may be changed for the row in shared documents screen 270 for the particular document to visually indicate that multiple requests exist for the particular electronic document. In response to a user selection of the graphic, symbol or icon, or of any content in the row itself, the row may be expanded into multiple rows to show all of the requests for the particular electronic document. Alternatively, multiple requests for a particular electronic document may be displayed in a dialog box or other graphical user interface objects.

Figure 3B:
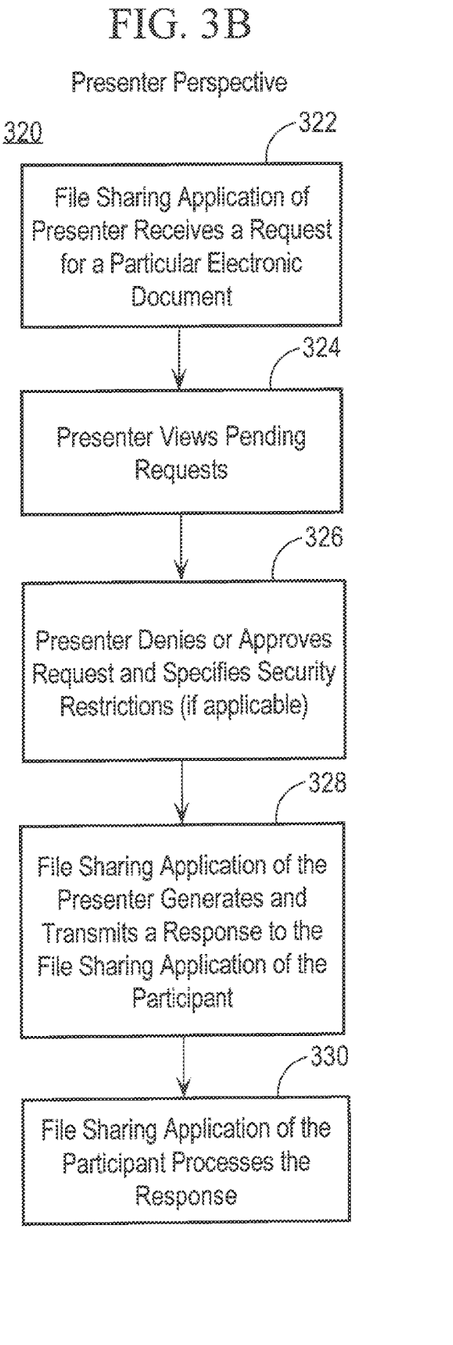
FIG. 3B is a flow diagram that depicts an approach for a sharing electronic documents during an electronic meeting from the perspective of a presenter.

FIG. 3B is a flow diagram 320 that depicts an approach for a sharing electronic documents during an electronic meeting from the perspective of a presenter. In step 322, a file sharing application of a presenter receives a request for a particular electronic document. The particular electronic document is displayed during a current electronic meeting or may have been displayed during a prior electronic meeting that has now concluded. The file sharing application of the presenter, for example, file sharing application 142, updates file sharing data for the presenter to include the request.

In step 324, the presenter views their pending requests, for example, by selecting shared documents 224 control. The presenters file sharing application detects selection of the shared documents 224 control and displays the shared documents screen 270 to show the requests for the presenter.

In step 326, the presenter denies or approves the request and optionally specifies security restrictions to be applied to the electronic document, as previously described herein. If the presenter specifies that security restrictions are to be applied to the electronic document, then the presenter may be queried for additional information or may select one or more options associated with applying security restrictions. For example, the presenter may be queried to enter a security code for the electronic document. The security code may be an alphanumeric sequence of any length and may have minimum requirements, such as a minimum number of alphanumeric characters. Alternatively, the presenter may select a graphical user interface control to automatically generate a random security code. The security code may be carried with the electronic document or the electronic document may be encrypted with the security code.

In step 328, the file sharing application of the presenter generates and transmits a response to the file sharing application of the participant that made the request. For example, file sharing application 142 on client device 104 may generate and transmit a response to file sharing application 116 on client device 102. The response may specify whether the request was denied or granted and if granted, may include either the particular electronic document or information, such as a link or reference, which provides access to the particular electronic document. For example, the response may include a link to the particular electronic document stored on client device 104 or on a cloud server. In situations where additional participants are participating in the electronic meeting, file sharing application 142 may also notify the respective file sharing applications of the other participants to indicate whether that the participant has requested the particular electronic document so that their respective electronic meeting screens 200 will indicate that the participant has requested the particular electronic document. Security restrictions that were specified by the presenter when granting the request may be applied to the particular electronic document in a wide variety of ways that may vary depending upon a particular implementation. For example, if Level 2 (Security Code) security restrictions were specified, the security code specified by the presenter may be transmitted in or with the particular electronic document. Alternatively, for stronger protection, the particular electronic document may be encrypted using the security code. File sharing application 142 may be configured to invoke operating system functionality or functionality provided by one or more other applications to add the security code to the particular electronic document or to encrypt the particular electronic document with the security code.

In step 330, the file sharing application of the participant processes the response received from the file sharing application of the presenter. For example, file sharing application 116 may process the response received from file sharing application 142. If the response indicates that the request was granted, file sharing application 116 retrieves and stores the particular electronic document, for example, on storage 122. File sharing application 116 also updates file sharing data 130 to indicate the current status of the request so that the requested documents screen 250 will indicate the current status of the participant's request for the particular electronic document. Any security restrictions applied to the particular electronic document by the presenter are subsequently enforced when the particular electronic document is accessed or processed. For example, security restrictions may be applied when an attempt is made to open the particular electronic document, and/or process the particular electronic document using applications, email, or at a printer multi-function peripheral (MFP), etc. Application of the security restrictions may require, for example, that a user enter a security code or be authenticated prior to accessing or processing the particular electronic document. For example, if Level 2 (Security Code) security restrictions were applied to the particular electronic document, the user may be required to enter the security code specified by the presenter to open the particular electronic document in an application program, such as a word processing program or a pdf viewer, or to print the particular electronic document at a printer or MFP.

C. Participant Authentication

It may be desirable in particular situations to provide additional security, for example, when a particular electronic document contains sensitive information. According to one embodiment, additional security is provided by a process referred to herein as "participant authentication" that conditions access to an electronic document on participation in an electronic meeting at which the electronic document was shared. Participant authentication requires that for a user to be granted access to an electronic document shared during an electronic meeting, the user must have both requested and been granted a copy of the electronic document in association with the electronic meeting, and been an actual participant of the electronic meeting in which the electronic document was shared. This prevents third parties from accessing an electronic document that was shared during an electronic meeting, even if the third party has a code or key to decrypt the electronic document.

Participant authentication may be implemented using a wide variety of techniques that may vary depending upon a particular implementation and that provide various levels of security. According to one embodiment, an entity, such as file sharing application 116, is configured to verify that a user requesting access to a particular electronic document that was shared during a particular electronic meeting was a participant (presenter and/or attendee) of the particular electronic meeting. Data may be stored, for example, in file sharing data 130, which specifies electronic documents that were shared during electronic meetings, along with the participants of those electronic meetings. The data may instead, or in addition to, be stored as part of an electronic document, e.g., in a header portion of an electronic document.

When the file sharing application 116 receives a request from a user to access the particular electronic document that was shared during a particular electronic meeting, file sharing application 116 verifies that the user was a participant (presenter and/or attendee) of the particular electronic meeting prior to granting access to the user of the particular electronic document. This may be implemented in addition to any encoding or encryption of the particular electronic document. Thus, in situations where an electronic document shared during an electronic meeting is also encoded or encrypted, once a determination has been made that the user is authorized to access the particular electronic document, then the user is prompted for a code or key to decrypt the particular electronic document. Participant authentication may also include the use of any type of user authentication.

Figure 4A:
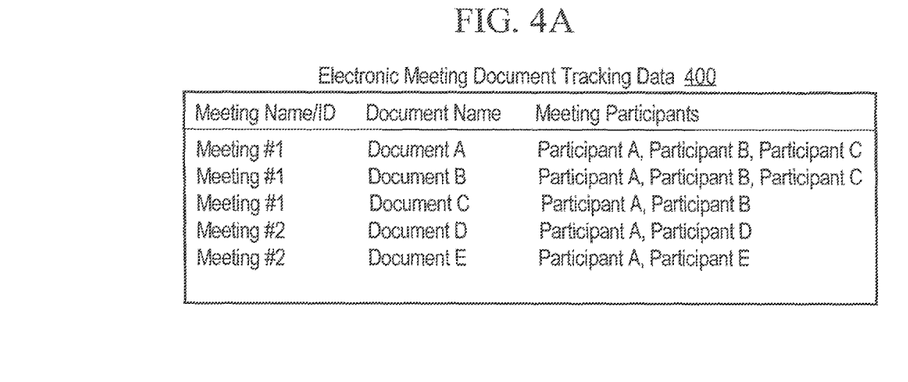
FIG. 4A depicts example electronic meeting tracking data.

FIG. 4A depicts example electronic meeting tracking data 400 that may be used by file sharing application 116 to determine whether a user requesting access to an electronic document was a participant in the electronic meeting at which the electronic document was shared. Electronic meeting tracking data 400 may be stored as part of file sharing data 130, or separately, and may be stored in any structure or format, depending upon a particular implementation. In the example depicted in FIG. 4A, electronic meeting tracking data 400 specifies, for each of a plurality of electronic meetings, electronic documents that were shared during the electronic meeting and participants who were present in the electronic meeting when the electronic documents were shared. For example, the first row of electronic meeting tracking data 400 indicates that during a meeting identified as "Meeting #1" a document named "Document A" was shared and that three meeting participants, identified as Participant A, Participant B and Participant C, were present during Meeting #1 when Document A was shared among the participants. Note that in Meeting #1, Participant C was no longer present in the electronic meeting when Document C was shared among the participants. Similarly, in Meeting #2, Participants A and D were present in the electronic meeting when Document D was shared among the participants and Participants A and E were present in the electronic meeting when Document E was shared among the participants. The tracking of participants during electronic meetings may be performed, for example, by collaboration client 114.

Figure 4B:
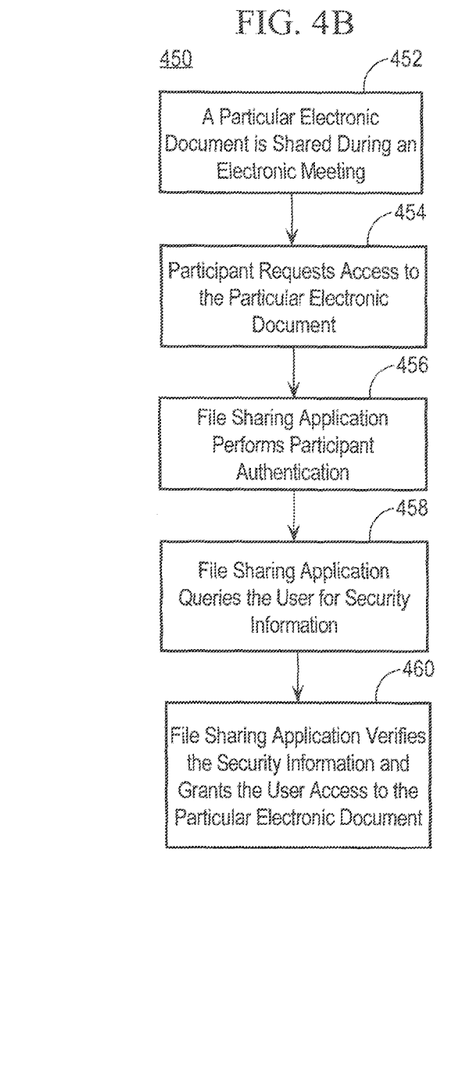
FIG. 4B is a flow diagram that depicts an approach for using participant authentication to manage access to electronic documents shared during an electronic meeting.

FIG. 4B is a flow diagram 450 that depicts an approach for using participant authentication to manage access to electronic documents shared during an electronic meeting. In step 452, a particular electronic document is shared during an electronic meeting. For purposes of this example, it is presumed that User A is a user of client device 102, is a participant of the electronic meeting and views the particular electronic document. It is further presumed that User A requests and is granted a copy of the particular electronic document, as previously described herein. The sharing of the particular electronic document during the electronic meeting may be tracked and documented by collaboration client 114. A copy of the particular electronic document is stored in requested file data 128 and electronic meeting tracking data 400 may be updated to specify that the particular electronic document was shared with User A during the electronic meeting. In this example, it is also presumed that the presenter who approved User A's request for the particular electronic document specified that security restrictions be applied to the particular electronic document and more specifically, that both participant authentication and encryption be applied to the particular electronic document.

In step 454, a participant requests access to the particular electronic document that was shared during the electronic meeting. For example, User A may request access to the particular electronic document by selecting one or more graphical user interface controls provided by file sharing application 116.

In step 456, file sharing application 116 performs participant authentication to verify whether the participant requesting access to the particular electronic document was a participant in the electronic meeting at which the particular electronic document was shared. For example, file sharing application 116 may consult electronic meeting tracking data 400 to verify whether User A was a participant in the electronic meeting at which the particular electronic document was shared.

Assuming that the participant authentication is successfully verified with respect to User A and the particular electronic document, then in step 458, file sharing application 116 queries the user for security information, based upon any security restrictions specified by the presenter. A wide variety of security approaches and/or security restrictions may be used with participant authentication. For example, according to one embodiment, electronic documents that are shared during electronic meetings are not encoded or encrypted, and access is controlled by file sharing application 116 verifying that a requestor was an actual participant of an electronic meeting at which a requested electronic document was shared. This approach may be considered to provide a relatively low level of security because once an electronic document is out of the control of file sharing application 116, the electronic document may be freely accessed by third parties. Alternatively, electronic documents that are shared during electronic meetings may be encoded or encrypted with data, such as a code or encryption key, specified by a presenter or automatically generated by the file sharing application of the presenter. This provides an additional level of security since an electronic document that is taken out of the control of file sharing application 116 is encoded or encrypted and can only be used by a third party if the third party knows the code or encryption key that was used to encrypt the electronic document.

For a higher level of security, an electronic document shared during an electronic meeting may be encoded or encrypted using data that is generated and/or supplied by the file sharing application of the presenter. The data may be a code or encryption key generated by the file sharing application of the presenter that is specific to the meeting at which the subject electronic document was shared. For example, data that is uniquely associated with the electronic meeting, such as a meeting identifier, may be used as an input to one or more hash functions to generate a unique key that is used to encrypt the electronic document. The key is unknown to the participant of the meeting (and third parties), so that if a third party obtains a copy of the encrypted electronic document, the third party will not be able to recover the original electronic document. The file sharing application of the presenter may generate a different code or encryption key for each electronic meeting and codes and encryption keys may also be specific to particular users and/or electronic documents shared during an electronic meeting.

For yet an even higher level of security, an electronic document shared during an electronic meeting may be encoded or encrypted using both 1) first data that is specified by the presenter; and 2) second data that is generated and/or supplied by the file sharing application of the presenter. The second data may be a code or encryption key generated by the file sharing application as previously described herein. The second data may be appended to the first data and used to encrypt the electronic document. As another example, the first data and the second data may be used as inputs to one or more hash functions to generate a key that is used to encrypt the electronic document. This approach provides the relatively highest level of security because a third party in possession of both the encrypted electronic document and the code or encryption key specified by the presenter is not able to decrypt the electronic document. Rather, in this situation, the electronic document can only be decrypted by a file sharing application after verifying that the requestor was a participant of the electronic meeting and after the requestor provides the first data specified by the presenter.

In step 460, file sharing application 116 verifies the security information, if applicable, and grants the requestor access to the particular electronic document. This may include decrypting an encrypted version of the electronic document to recover the original electronic document. The file sharing application 116 of the participant may obtain, from the file sharing application of the presenter, the data necessary to decrypt the encrypted electronic document. This may include, for example, the first data, the second data, or both the first data and the second data previously described herein.

In contrast to the foregoing, suppose that in step 254, User B, who was not a participant of the electronic meeting, requests access to the particular electronic document. In step 456, User B would not be successfully authenticated as a participant of the electronic meeting since User B was not a participant of the electronic meeting and therefore would not be granted access to the particular electronic document.

Granting of access to the electronic document may be provided in several ways that may vary depending upon a particular implementation. For example, file sharing application 116 may provide access to an unprotected version of the electronic document. As another example, file sharing application 116 may provide controlled access to the electronic document, e.g., via a viewer or other mechanism of file sharing application 116, without allowing a copy of the unprotected electronic document to be made.

IV. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
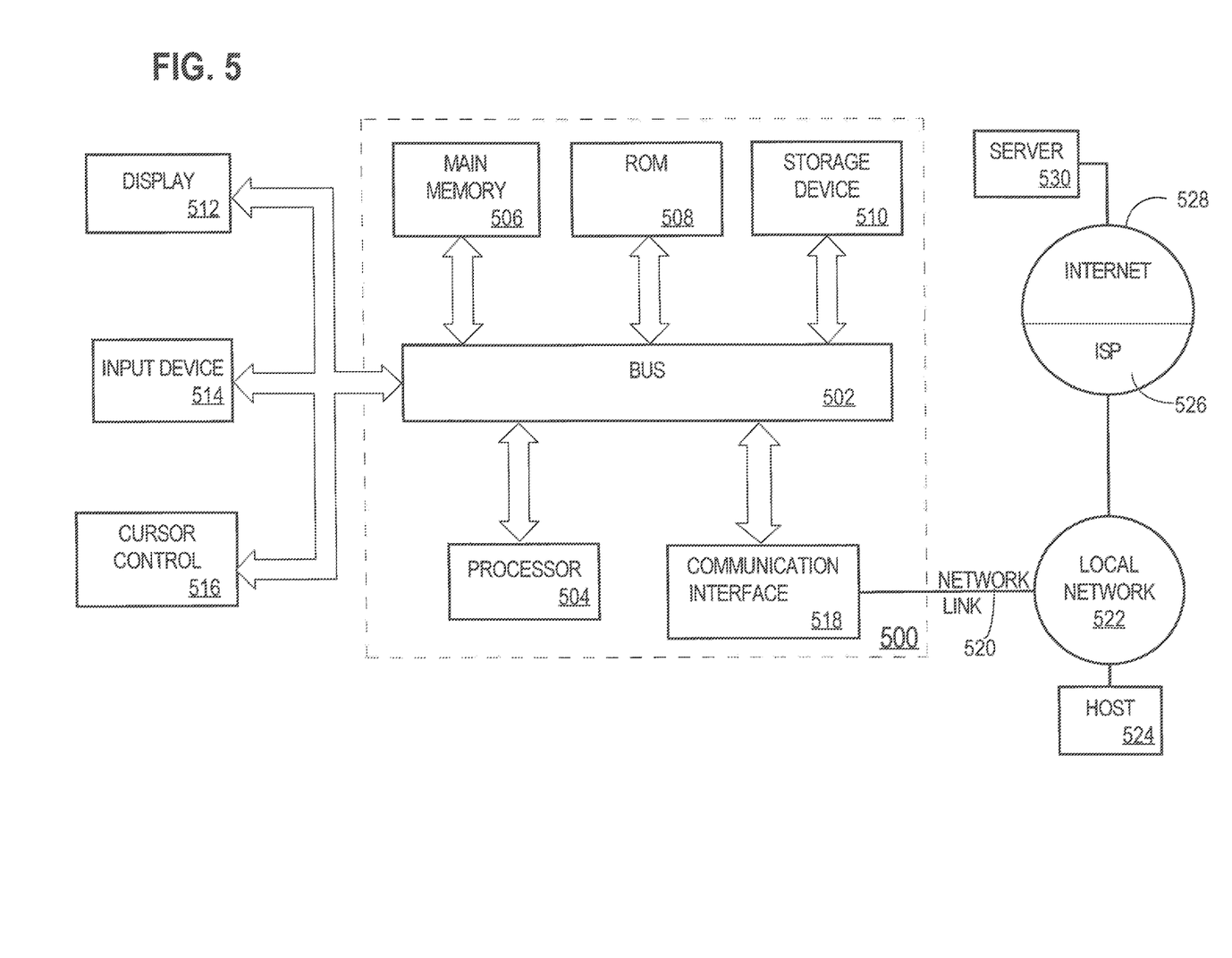
FIG. 5 is a block diagram that depicts an example computer system upon which embodiments may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution, or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment, those techniques are performed by computer system 500 in response to processor 504 processing instructions stored in main memory 506. Such instructions may be read into main memory 506 from another computer-readable medium, such as storage device 510. Processing of the instructions contained in main memory 506 by processor 504 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 504. For example, the instructions may initially be stored on a storage medium of a remote computer and transmitted to computer system 500 via one or more communications links. Bus 502 carries the data to main memory 506, from which processor 504 retrieves and processes the instructions. The instructions received by main memory 506 may optionally be stored on storage device 510 either before or after processing by processor 504.

Computer system 500 also includes a communication interface 518 coupled to bus 502. Communication interface 518 provides a communications coupling to a network link 520 that is connected to a local network 522. For example, communication interface 518 may be a modem to provide a data communication connection to a telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be processed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A first apparatus for providing an improvement in the sharing of electronic documents between network devices during electronic meetings, the first apparatus comprising:
   one or more processors;
   one or more memories communicatively coupled to the one or more processors;
   a display;
   a collaboration client executing on the first apparatus and configured to:
      support an electronic meeting via one or more computer networks with a second apparatus that is external to and different from the first apparatus, wherein the second apparatus corresponds to a presenter participant of the electronic meeting, and
      generate and display, on the display of the first apparatus, a graphical user interface that includes:
         a first set of one or more graphical user interface controls that allow a user of the first apparatus to request a particular electronic document currently being displayed during the electronic meeting; and
         an attendee list that:
            lists a plurality of participants of the electronic meeting that includes at least the presenter participant and at least one non-presenting participant, and
            specifies for each participant, from the plurality of participants of the electronic meeting, whether the participant has requested the particular electronic document from the presenter participant; and
   a file sharing application executing on the first apparatus and configured to:
      in response to a user selection of the first set of one or more graphical user interface controls that allow a user of the first apparatus to request a particular electronic document currently being displayed during the electronic meeting:
         determine, based upon file sharing data stored in the one or more memories of the first apparatus, that the presenter participant is the presenter of the particular electronic document, and
         generate and transmit to the second apparatus via the one or more computer networks, a request for the particular electronic document currently being displayed during the electronic meeting,
         wherein at the second apparatus, in response to receiving the request for the particular electronic document currently being displayed during the electronic meeting, a collaboration client executing on the second apparatus causes to be displayed on a display of the second apparatus, a plurality of graphical user interface controls that include a control to allow the presenter participant to deny the request and two or more controls to allow the presenter participant to accept the request, wherein each control, from the two or more controls to allow the presenter participant to accept the request, corresponds to a different security restriction level, at the second apparatus, the presenter participant selects a particular control for accepting the request and the particular control corresponds to a particular restriction level, receive, from the second apparatus via the one or more computer networks, a response to the request for the particular electronic document currently being displayed during the electronic meeting, wherein the response to the request for the particular electronic document currently being displayed during the electronic meeting includes the particular electronic document and was generated in response to the presenter participant approving the request for the particular electronic document currently being displayed during the electronic meeting, and cause the particular electronic document to be presented to the user of the first apparatus subject to the particular security restriction level that corresponds to the control selected by the presenter participant.

2. The first apparatus of claim 1, wherein the data generated by the file sharing application of the presenter participant of the particular electronic document during the electronic meeting is specific to the electronic meeting.

3. The first apparatus of claim 1, wherein the file sharing application is further configured to decrypt the encrypted version of the particular electronic document to recover the particular electronic document using both the data generated by the file sharing application of the presenter participant of the particular electronic document during the electronic meeting and the data specified by the presenter participant of the particular electronic document during the electronic meeting.

4. The first apparatus of claim 1, wherein the data specified by the presenter participant of the particular electronic document during the electronic meeting is an alphanumeric string.

5. The first apparatus of claim 1, wherein the encrypted version of the particular electronic document is generated by the file sharing application of the presenter participant of the particular electronic document during the electronic meeting using data generated by the file sharing application of the presenter participant of the particular electronic document during the electronic meeting.

6. The first apparatus of claim 1, wherein the file sharing application is further configured to request from the file sharing application of the presenter participant of the particular electronic document during the electronic meeting, one or more of the data generated by the file sharing application of the presenter participant of the particular electronic document during the electronic meeting, or the data specified by the presenter participant of the particular electronic document during the electronic meeting.

7. The first apparatus of claim 1, wherein the file sharing application is further configured to cause the particular electronic document to be displayed to the user in a read-only viewer that prohibits a copy of the particular electronic document from being made.

8. One or more non-transitory computer-readable media for providing an improvement in the sharing of electronic documents between network devices during electronic meetings, the one or more non-transitory computer-readable media storing instructions which, when processed by one or more processors, cause:

a collaboration client executing on a first apparatus to:
support an electronic meeting via one or more computer networks with a second apparatus that is external to and different from the first apparatus, wherein the second apparatus corresponds to a presenter participant of the electronic meeting, and
generate and display, on the display of the first apparatus, a graphical user interface that includes:
a first set of one or more graphical user interface controls that allow a user of the first apparatus to request a particular electronic document currently being displayed during the electronic meeting; and
an attendee list that:
lists a plurality of participants of the electronic meeting that includes at least the presenter participant and at least one non-presenting participant, and
specifies for each participant, from the plurality of participants of the electronic meeting, whether the participant has requested the particular electronic document from the presenter participant; and a file sharing application executing on the first apparatus to:
in response to a user selection of the first set of one or more graphical user interface controls that allow a user of the first apparatus to request a particular electronic document currently being displayed during the electronic meeting:
determine, based upon file sharing data stored in the one or more memories of the first apparatus, that the presenter participant is the presenter of the particular electronic document, and
generate and transmit to the second apparatus via the one or more computer networks, a request for the particular electronic document currently being displayed during the electronic meeting,
wherein at the second apparatus, in response to receiving the request for the particular electronic document currently being displayed during the electronic meeting, a collaboration client executing on the second apparatus causes to be displayed on a display of the second apparatus, a plurality of graphical user interface controls that include a control to allow the presenter participant to deny the request and two or more controls to allow the presenter participant to accept the request, wherein each control, from the two or more controls to allow the presenter participant to accept the request, corresponds to a different security restriction level,
at the second apparatus, the presenter participant selects a particular control for accepting the request and the particular control corresponds to a particular restriction level,
receive, from the second apparatus via the one or more computer networks, a response to the request for the particular electronic document currently being displayed during the electronic meeting, wherein the response to the request for the particular electronic document currently being displayed during the electronic meeting includes an encrypted version of the particular electronic document and the response was generated in response to the presenter participant approving the request for the particular electronic document currently being displayed during the electronic meeting, and cause the particular electronic document to be presented to the user of the first apparatus subject to the particular security restriction level that corresponds to the control selected by the presenter participant.

9. The one or more non-transitory computer-readable media of claim 8, wherein the data generated by the file sharing application of the presenter participant of the particular electronic document during the electronic meeting is specific to the electronic meeting.

10. The one or more non-transitory computer-readable media of claim 8, further comprising additional instructions which, when processed by the one or more processors, cause the file sharing application to decrypt the encrypted version of the particular electronic document to recover the particular electronic document using both the data generated by the file sharing application of the presenter participant of the particular electronic document during the electronic meeting and the data specified by a presenter participant of the particular electronic document during the electronic meeting.

11. The one or more non-transitory computer-readable media of claim 8, wherein the data specified by the presenter participant of the particular electronic document during the electronic meeting is an alphanumeric string.

12. The one or more non-transitory computer-readable media of claim 8, wherein the encrypted version of the particular electronic document is generated by the file sharing application of a presenter participant of the particular electronic document during the electronic meeting using data generated by the file sharing application of the presenter participant of the particular electronic document during the electronic meeting.

13. The one or more non-transitory computer-readable media of claim 8, further comprising additional instructions which, when processed by the one or more processors, cause the file sharing application to request from the file sharing application of the presenter participant of the particular electronic document during the electronic meeting, one or more of the data generated by the file sharing application of the presenter participant of the particular electronic document during the electronic meeting, or the data specified by the presenter participant of the particular electronic document during the electronic meeting.

14. The one or more non-transitory computer-readable media of claim 8, further comprising additional instructions which, when processed by the one or more processors, cause the file sharing application to cause the particular electronic document to be displayed to the user in a read-only viewer that prohibits a copy of the particular electronic document from being made.

15. A computer-implemented method for providing an improvement in the sharing of electronic documents between apparatuses during electronic meetings, the computer-implemented method comprising:

a collaboration client executing on a first apparatus:
supporting an electronic meeting via one or more computer networks with a second apparatus that is external to and different from the first apparatus, wherein the second apparatus corresponds to a presenter participant of the electronic meeting, and generating and displaying, on the display of the first apparatus, a graphical user interface that includes:
a first set of one or more graphical user interface controls that allow a user of the first apparatus to request a particular electronic document currently being displayed during the electronic meeting; and
an attendee list that:
lists a plurality of participants of the electronic meeting that includes at least the presenter participant and at least one non-presenting participant, and
specifies for each participant, from the plurality of participants of the electronic meeting, whether the participant has requested the particular electronic document from the presenter participant; and a file sharing application executing on the first apparatus:
in response to a user selection of the first set of one or more graphical user interface controls that allow a user of the first apparatus to request a particular electronic document currently being displayed during the electronic meeting:
determining, based upon file sharing data stored in the one or more memories of the first apparatus, that the presenter participant is the presenter of the particular electronic document, and
generating and transmitting to the second apparatus via the one or more computer networks, a request for the particular electronic document currently being displayed during the electronic meeting,
wherein at the second apparatus, in response to receiving the request for the particular electronic document currently being displayed during the electronic meeting, a collaboration client executing on the second apparatus causes to be displayed on a display of the second apparatus, a plurality of graphical user interface controls that include a control to allow the presenter participant to deny the request and two or more controls to allow the presenter participant to accept the request, wherein each control, from the two or more controls to allow the presenter participant to accept the request, corresponds to a different security restriction level,
at the second apparatus, the presenter participant selects a particular control for accepting the request and the particular control corresponds to a particular restriction level,
receiving, from the second apparatus via the one or more computer networks, a response to the request for the particular electronic document currently being displayed during the electronic meeting, wherein the response to the request for the particular electronic document currently being displayed during the electronic meeting includes the particular electronic document and was generated in response to the presenter participant approving the request for the particular electronic document currently being displayed during the electronic meeting, and
causing the particular electronic document to be presented to the user of the first apparatus subject to the particular security restriction level that corresponds to the control selected by the presenter participant.

16. The computer-implemented method of claim 15, wherein the data generated by the file sharing application of the presenter participant of the particular electronic document during the electronic meeting is specific to the electronic meeting.

17. The computer-implemented method of claim 15, further comprising the file sharing application decrypting the encrypted version of the particular electronic document to recover the particular electronic document using both the data generated by a file sharing application of the presenter participant of the particular electronic document during the electronic meeting and the data specified by the presenter participant of the particular electronic document during the electronic meeting.

18. The computer-implemented method of claim 15, wherein the data specified by the presenter participant of the particular electronic document during the electronic meeting is an alphanumeric string.

19. The computer-implemented method of claim 15, wherein the encrypted version of the particular electronic document is generated by the file sharing application of a presenter participant of the particular electronic document during the electronic meeting using data generated by the file sharing application of the presenter participant of the particular electronic document during the electronic meeting.

20. The computer-implemented method of claim 15, further comprising the file sharing application requesting from the file sharing application of the presenter participant of the particular electronic document during the electronic meeting, one or more of the data generated by the file sharing application of the presenter participant of the particular electronic document during the electronic meeting, or the data specified by the presenter participant of the electronic document during the electronic meeting.

* * * * *